Jan. 6, 1953 W. O. WOLFORD 2,624,359
FUEL SAFETY SHUTOFF
Filed April 5, 1949
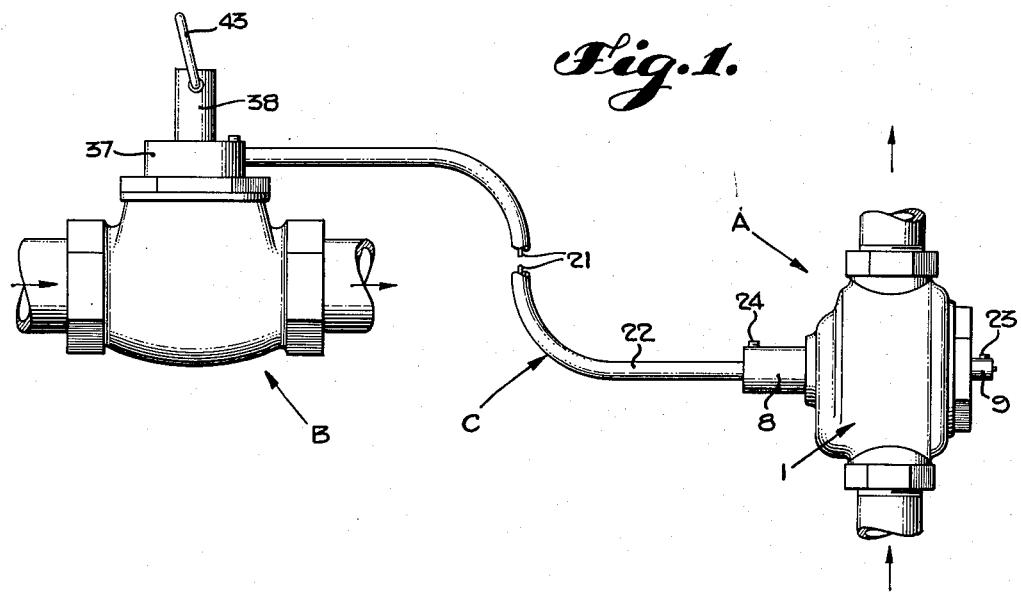
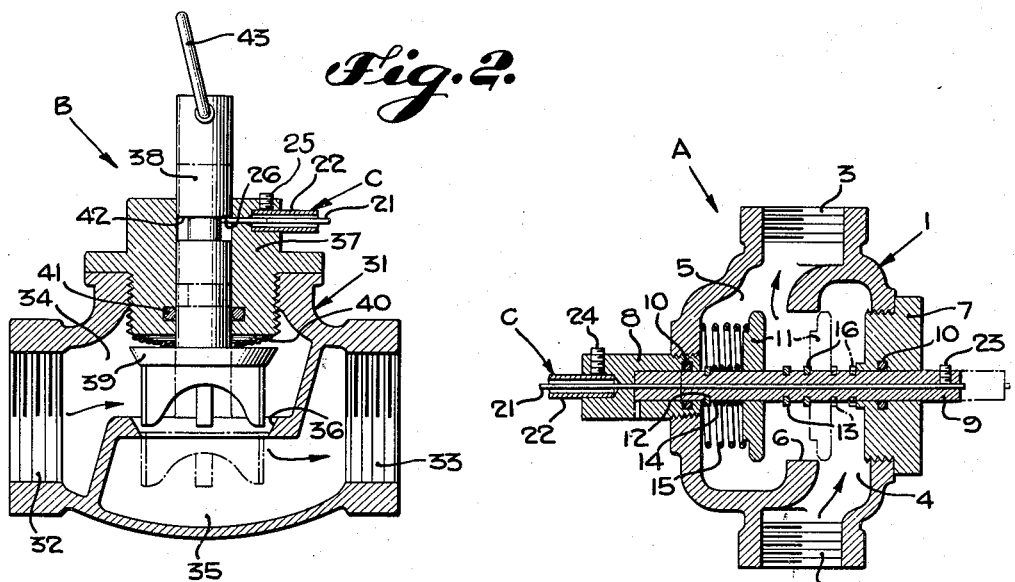
WILLIAM O. WOLFORD,
INVENTOR.
BY
ATTORNEYS Patented Jan. 6, 1953

2,624,359

UNITED STATES PATENT OFFICE 2,624,359

FUEL SAFETY SHUTOFF

William O. Wolford, Los Angeles, Calif., assignor to Kelite Products, Inc., Los Angeles, Calif., a corporation of California Application April 5, 1949, Serial No. 85,585

3 Claims. (Cl. 137—94)

My invention relates to fuel safety shut-off apparatus, and has particular application under conditions in which it is desired to shut off the flow of gas or other fuel in the event of failure of a water supply to a boiler fired by such fuel. Included in the objects of my invention are:

First, to provide an apparatus of this class, wherein a fuel valve may be latched open only in the event of flow in a related water supply line, and is automatically unlatched and closed should such water flow cease, and under such conditions must be manually reset for further operation.

Second, to provide an apparatus of this class, which may be readily set to function at any desired water flow rate.

Third, to provide an apparatus of this class, which is not affected by water pressure, but only by pressure differential due to water flow.

With the above and other objects in view as may appear hereinafter, reference is made to the accompanying drawings in which:

Fig. 1 is an elevational view of my apparatus showing the two valves involved, and the connecting means.

Fig. 2 is a sectional view of the fuel valve showing by solid lines its latched position, and by dotted lines its unlatched or closed position.

Fig. 3 is a sectional view of the water valve showing by solid lines its operating position, and by dotted lines its position when flow ceases.

My fuel safety shut-off apparatus involves a water valve A, a fuel valve B, and a connecting control cable C. The water valve is connected to a boiler or the like, which is heated by burners, the fuel of which is supplied through the fuel valve B. The purpose of my apparatus is to close the fuel valve and shut off the burners automatically in the event the water supply is shut off.

The water valve A includes a body 1 defining an inlet 2 and an outlet 3, communicating respectively with valve chambers 4 and 5. The valve chambers are disposed coaxially and are connected by a large port 6. The inlet valve chamber 4 is provided with an opening which is closed by a threaded plug 7. A smaller plug 8 is fitted in the corresponding wall of the outlet valve chamber 5.

A valve stem 9 is slidably mounted in a socket provided in the plug 8, and extends through the port 6 and through a bore provided in the plug 7. Suitable sealing rings 10 are provided between the valve stem 9 and the plugs 7 and 8. The valve stem slidably receives a valve disk 11, which is limited in movement by spaced stop rings 12 and 13. A spring 14 fitted on the valve stem, bears against stop ring 12 and urges the valve disk toward stop ring 13. A second spring 15 surrounds the valve stem disk, and bears on the wall of the outlet chamber surrounding the plug 8 and against valve disk 11. A snap ring 16 limits travel of the stem 9 by engaging the plug 7 so that under static conditions the valve disk occupies a slightly open position at the intake side of the port 6, as indicated by broken lines. In the event of flow through the valve, spring 15 is compressed a proportionate amount. This causes the valve disk to effect, through spring 14, a similar movement of the valve stem 9.

The valve stem 9 is provided with a small bore therethrough, which receives a thrust wire 21 forming the core of cable C. The thrust wire 21 extends entirely through the valve stem and is secured by a set screw 23 accessible from the outside of the valve, thus providing a means of adjustment. The thrust wire 21 is contained in a sheath 22 in the form of a solid tube, or a tube formed by close coiled wire. A set screw 24 secures the sheath 22 in the plug 8. The cable C extends to the fuel valve B.

The fuel valve B includes a valve body 31 having an inlet 32 and an outlet 33, and valve chambers 34 and 35, associated respectively with said inlet and outlet. The valve chambers are connected by a port 36 which is in alignment with an opening provided in the confronting wall of the inlet valve chamber 34. This opening receives a threaded plug 37, having a bore which slidably receives a stem 38 at the lower end of which is carried a valve head 39 adapted to seat in the port 36. A spring 40 urges the valve head towards the closed portion shown by broken lines in Fig. 2.

A sealing ring 41 is provided between the plug 37 and valve stem.

The valve stem is provided with an annular channel 42. This channel is adapted to be engaged by the thrust wire 21 which extends laterally through an appropriate opening provided in the threaded plug 37. This opening is counterbored to receive the corresponding end of the sheath 22, which is held in place by a set screw 25. The extremity of the thrust wire forms a latch, designated 26, which fits in the channel 42 and retains the valve head in its upper or open position, shown by solid lines in Fig. 2. A handle 43 is provided at the outer end of the stem 38.

Operation of my fuel safety shut-off apparatus is as follows:

Under conditions of flow in the valve A, the valve disk urges the valve stem 9 and the thrust wire 21 through spring 15, in a direction to extend the latch end 26. Under this condition, the stem 38 of the fuel valve, may be raised until the latch 26 snaps into the channel 42, under urge of the spring 14. As long as flow continues in the water valve A, the fuel valve B is open. Should the water supply be cut off, the thrust wire 21 is retracted under urge of the spring 15, releasing the stem 38 and permitting the fuel valve to close.

By reason of the fact that the valve disk is slightly open under static conditions, reverse flow may be had for drainage purposes. Furthermore, if desired, the valve disk may have a normally fully open position at the upstream or intake side to the right of the position shown. In such case, resetting of the valves requires the additional manual operation of pushing the stem 9 until the valve disk is within its port.

Having fully described my invention, it is to be understood that I do not wish to be limited to the details herein set forth, but my invention is of the full scope of the appended claims.

I claim:

1. A fuel safety shut-off apparatus, involving: a fuel valve having valve means for controlling flow through said fuel valve and yieldable means urging said valve means toward a closed position; latch means including a cable and a slidable latching element therein for restraining said valve means in an open position; and a remotely positioned supply valve including a valve element movable in response to fluid flowing through said supply valve, a slidable valve stem in turn slidably mounting and guiding said valve element and having stops limiting movement of said valve element in opposite directions relative to said valve stem; a yieldable means urging said valve element against one of said stops in opposition to the direction of flow through said supply valve; said stem being connected with said slidable latching element to release for closure the valve means of said fuel valve when the flow rate past said valve element decreases a predetermined amount.

2. A fuel safety shut-off apparatus, involving: a supply valve including a valve body having a flow passage therethrough, a slidable stem penetrating said flow passage, a valve element movable along said stem in response to flow through said passage, yieldable means connecting said valve element and stem to apply a force tending to effect corresponding movement of said stem; a cable including a slidably mounted element connected with said stem; and a fuel valve having valve means for controlling flow therethrough and having a means urging said valve means toward a closed position, said slidably mounted element latching said fuel valve means in an open position under predetermined conditions of flow in said supply valve.

3. A fuel safety shut-off apparatus, involving: a fuel valve having means for controlling flow therethrough and having yieldable means urging said fuel valve means to a closed position; latch means including a cable and slidably mounted element therein; and a supply valve including a valve body defining an inlet, an outlet and a port communicating therebetween; a valve stem extending through said port and protruding from said valve body and slidably supported thereby; a valve element slidably mounted on said valve stem and movable in said port; means urging said valve element into a position throttling said port and yieldable to fluid flowing through said valve body to open said port, means connecting said valve stem with the slidably mounted means of said cable, and means on said stem engageable by said valve element on movement thereof to its port throttling position to slide said valve stem and release said latch.

WILLIAM O. WOLFORD.

REFERENCES CITED

The following references are of record in the file of this patent:

UNITED STATES PATENTS

| Number | Name | Date |
|---|---|---|
| 933,880 | Brown | Sept. 14, 1909 |
| 1,165,554 | Sullivan | Dec. 28, 1915 |
| 1,877,221 | Brown | Sept. 13, 1932 |
| 2,012,873 | Gillen | Aug. 27, 1935 |